United States Patent [19]
Pang

[11] Patent Number: 4,989,309
[45] Date of Patent: Feb. 5, 1991

[54] BLADE BINDING CORD GUIDING ARRANGEMENT FOR VENETIAN BLIND MAKING MACHINE

[76] Inventor: Liu C. Pang, No. 301, Kuang Fu Rd., Chu Nan Village, Miaoli County, Taiwan

[21] Appl. No.: 518,506

[22] Filed: May 2, 1990

[51] Int. Cl.[5] .............. B23P 19/04
[52] U.S. Cl. .............. 29/24.5
[58] Field of Search .............. 29/24.5

[56] References Cited

FOREIGN PATENT DOCUMENTS 0024924 2/1987 Japan .............. 29/24.5

*Primary Examiner*—Timothy V. Eley
*Assistant Examiner*—C. Richard Martin
*Attorney, Agent, or Firm*—Morton J. Rosenberg; David I. Klein

[57] ABSTRACT

This invention relates to a new structure of blade binding cord guiding arrangement for venetian blind making machine and more particularly to an arrangement which drives the blade binding cord to be movably positioned at predetermined position and prop open the binding cord for smooth insertion of blind blades and to let the transverse lines of the ladder-like blade binding cord be intermittently set at both lateral sides of the venetian blind control rope, so as to let the ladder-like blade binding cord be smoothly piled up when the venetian blind is collapsed.

1 Claim, 8 Drawing Sheets

BLADE BINDING CORD GUIDING ARRANGEMENT FOR VENETIAN BLIND MAKING MACHINE

BACKGROUND OF THE INVENTION

The present invention is related to an innovative blade binding cord guiding arrangement for venetian blind making machine, which is including a slotted selector assembly to control the positioning of a sliding assembly and to drive an expander to stretch open the ladder-like blade binding cord for smooth insertion of blind blades so as to eliminate the bumping of the blades against the binding cord during manufacturing process.

According to conventional venetian blind manufacturing process, during insertion of blind blades, the bumping problem of the blades against the blade binding cord is frequently happened, which problem is normally resulted from improper stretching of the blade binding cord and may seriously interfere with the manufacturing process.

Therefore, it is the main object of the present invention to eliminate the said problem. Through a slotted selector assembly matching with a sliding assembly and an expander, the blade binding cord is fully stretched open for smooth insertion therethrough of blind blades.

The features and advantages of the present invention will become apparent from the following detailed description of the preferred embodiment considered in connection with the annexed drawings as hereunder.

BRIEF DESCRIPTION OF THE DRAWINGS

FIG. 8-1 is a schematic drawing, illustrating the operation of the present invention.

DETAILED DESCRIPTION OF THE PREFERRED EMBODIMENTS

Figure 1:
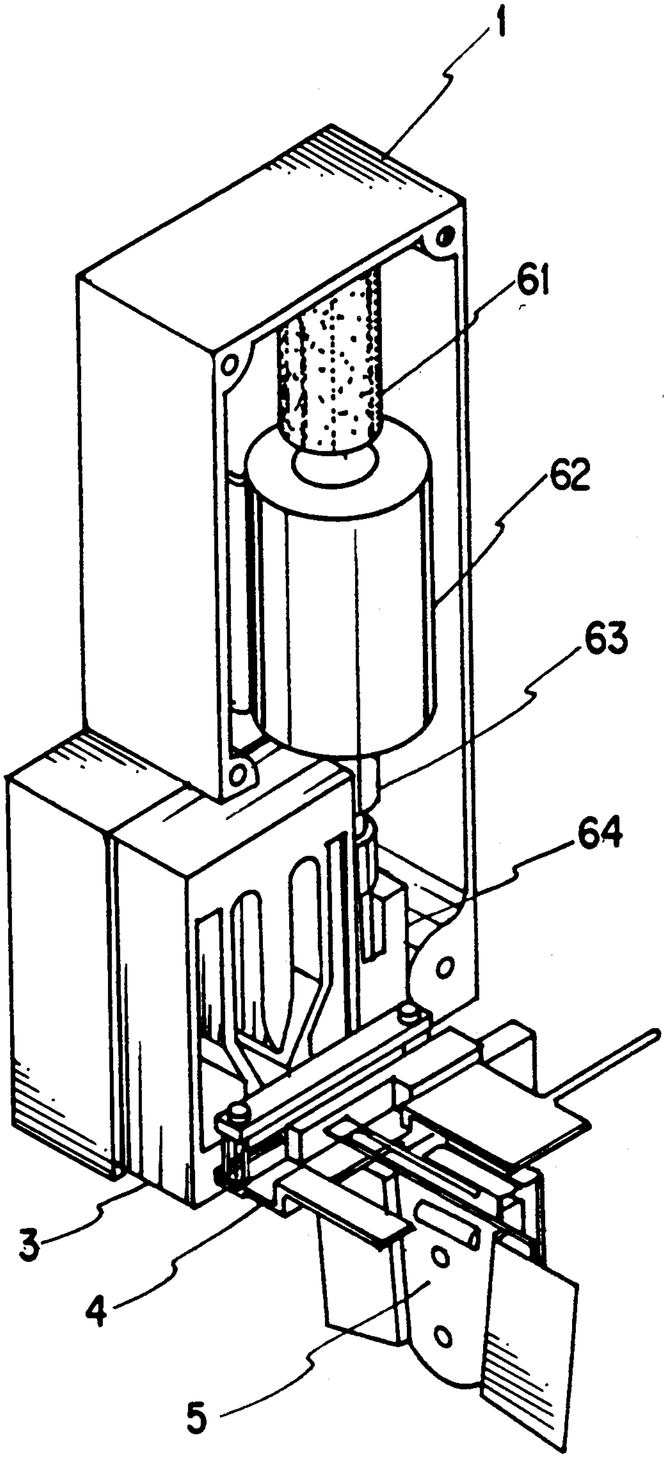
FIG. 1 is a perspective view, illustrating the outer appearance of the present invention.
Figure 2:
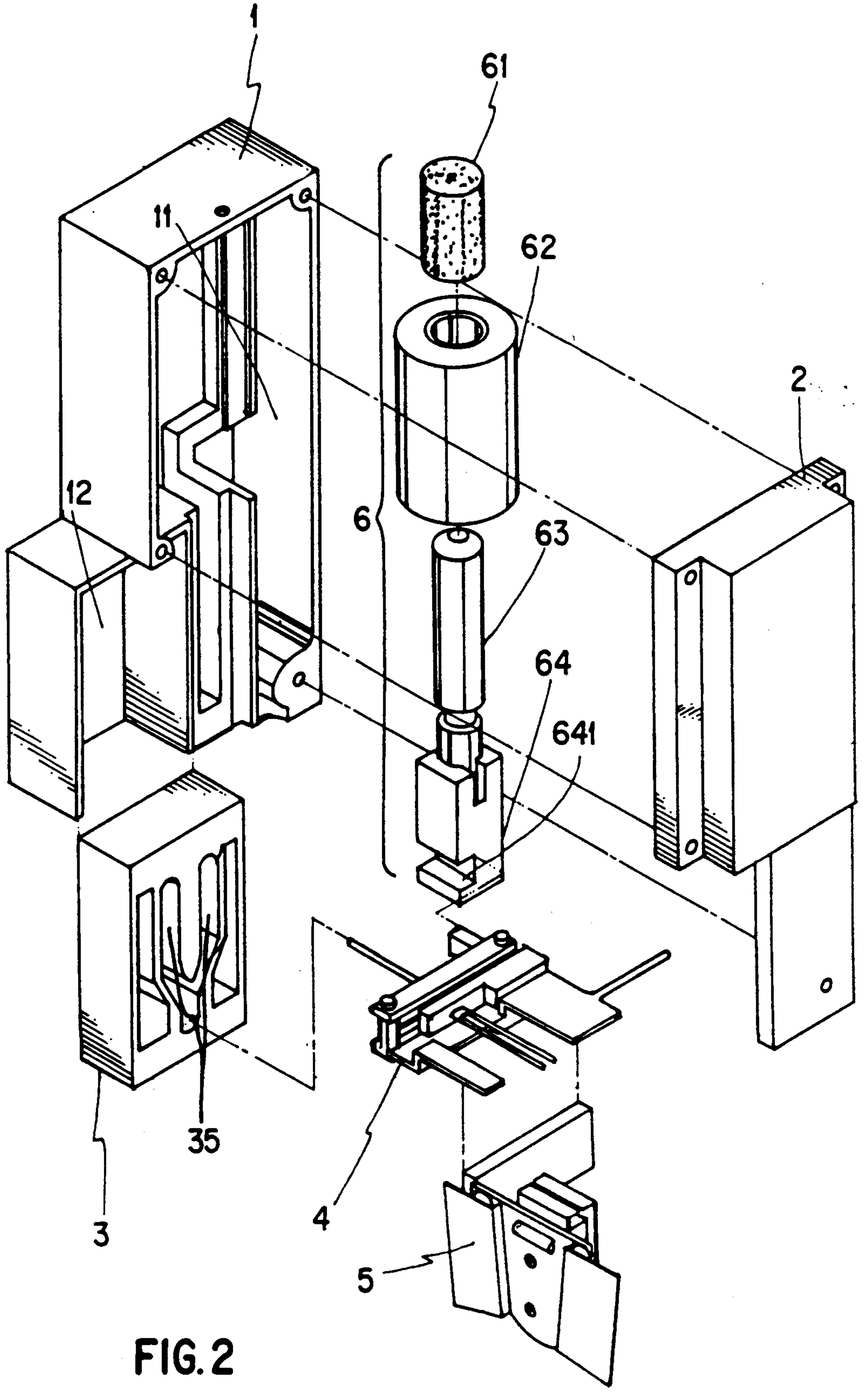
FIG. 2 is a perspective fragmentary view of the present invention.

With reference to FIGS. 1 and 2, a blade binding cord guiding arrangement for venetian blind making machine constructed according to the present invention is including a housing (1), a cover (2), a slotted selector assembly (3), a sliding assembly (4), an expander (5), and a lifter (6), wherein the housing is comprising a first chamber (11) and a second chamber (12); the lifter (6) is set in the first chamber (11) and covered by the cover (2); the slotted selector assembly (3) is set outside the second chamber (12); the sliding assembly (4) is mounted on the slotted selector assembly (3); and the expander (5) is connected to the sliding assembly (4) at the bottom.

Figure 3A:
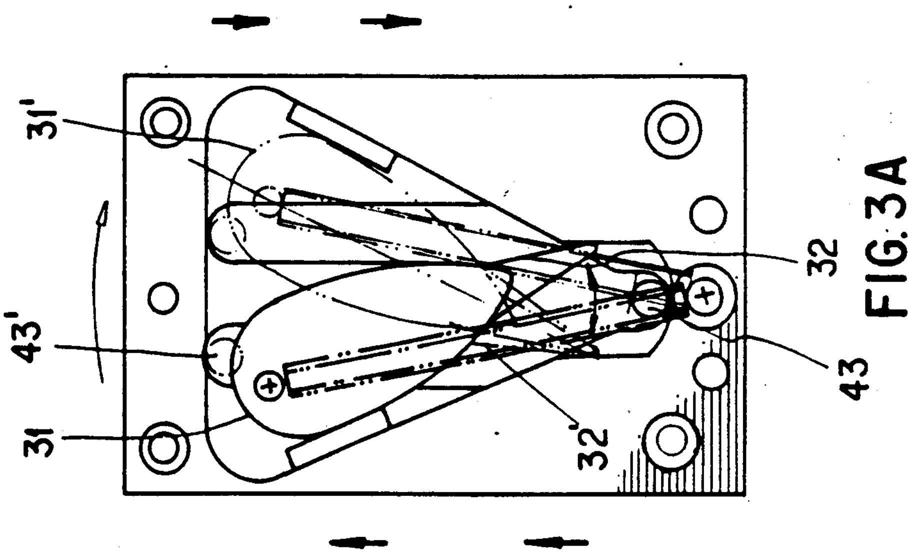
FIG. 3A illustrates the operation of the slotted selector assembly according to the present invention.
Figure 3:
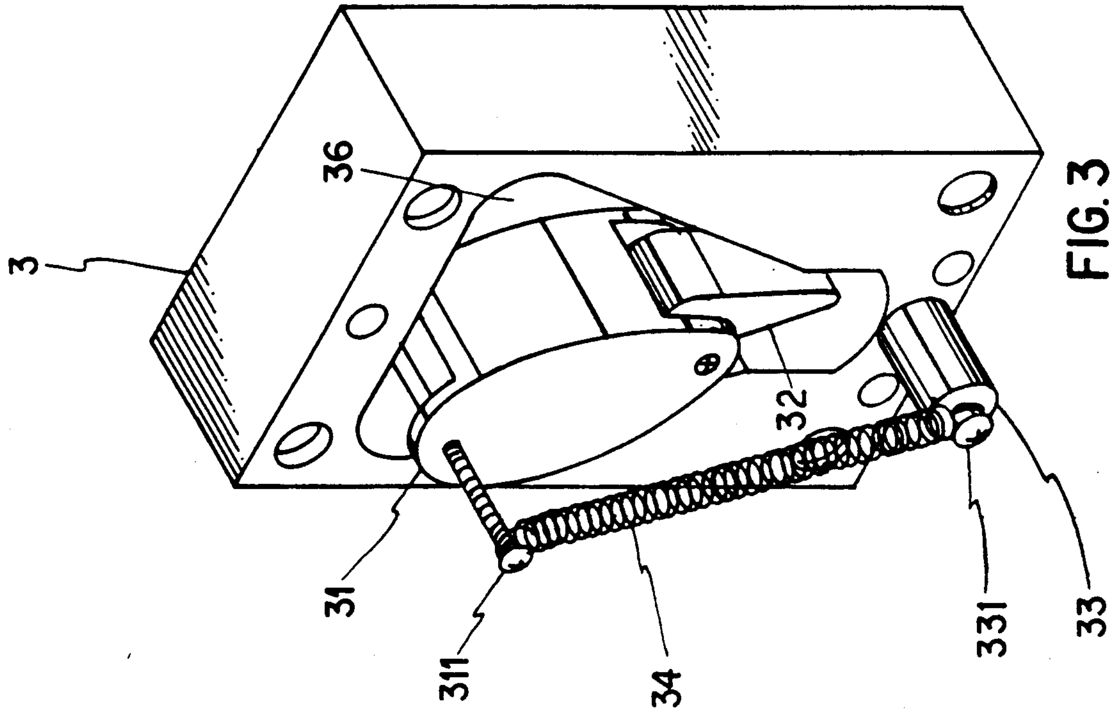
FIG. 3 is a perspective view of the slotted selector assembly according to the present invention.
Figure 4:
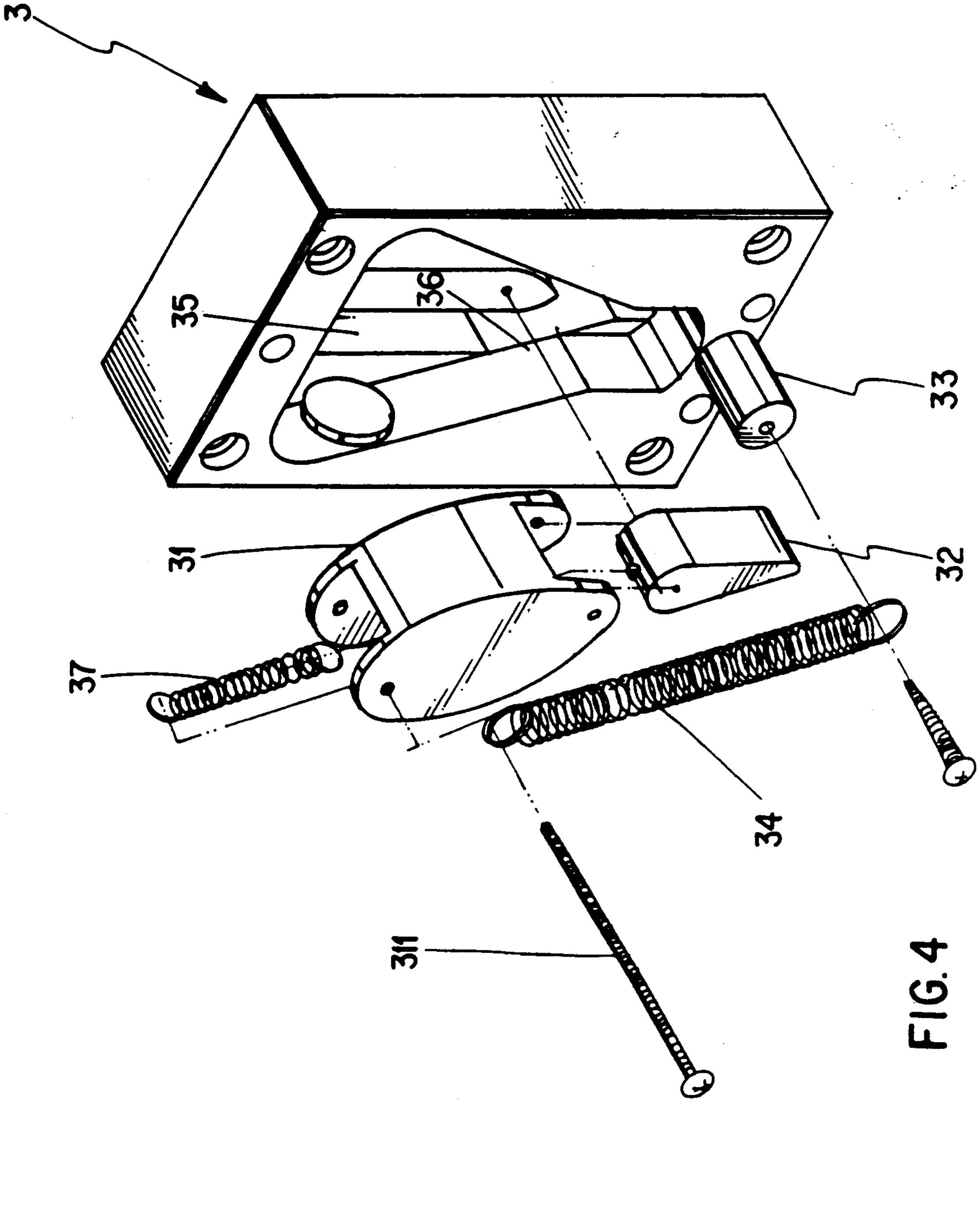
FIG. 4 is a fragmentary view of the slotted selector assembly according to the present invention.

With reference to FIGS. 3 and 4, the slotted selector assembly (3) is comprised of a selector block (31), a support (32), a supporting stand (33), springs (34) and (37), "Y" shaped sliding way (35), and "Y" shaped notch (36). The selector block (31) is having its bottom end connected with the top end of the support (32) by means of screw means and movably disposed in the middle of the "Y" shaped notch (36). A screw bolt (311) is mounted on the selector block (31) at an upper position for connection of the selector block (31) with the supporting stand (33) by means of the spring (34). The spring (37) is having one end connected to the top end of the support (32) and having the other end inserted through the selector block (31) to connect to the screw bolt (311) at the middle.

Figure 5:
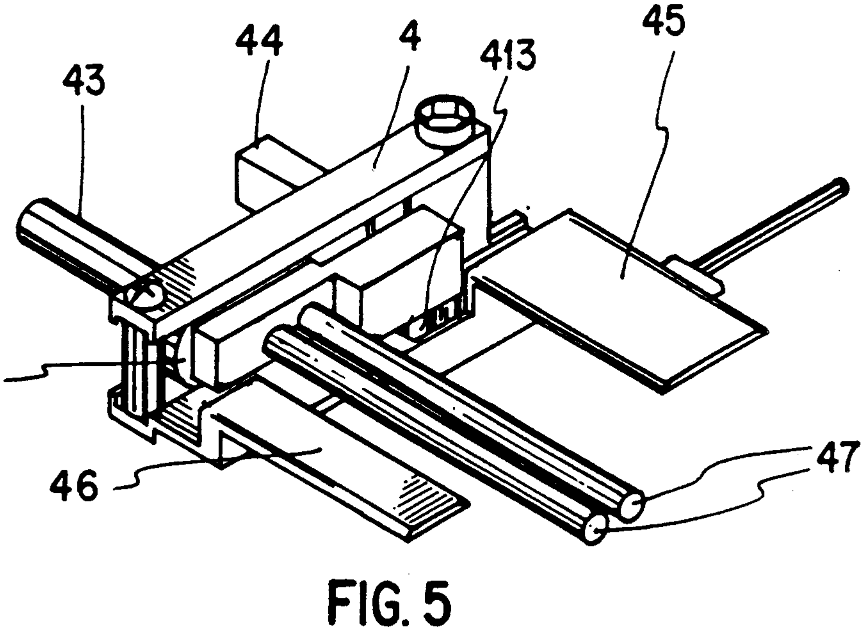
FIG. 5 is a perspective view of the sliding assembly according to the present invention.
Figure 6:
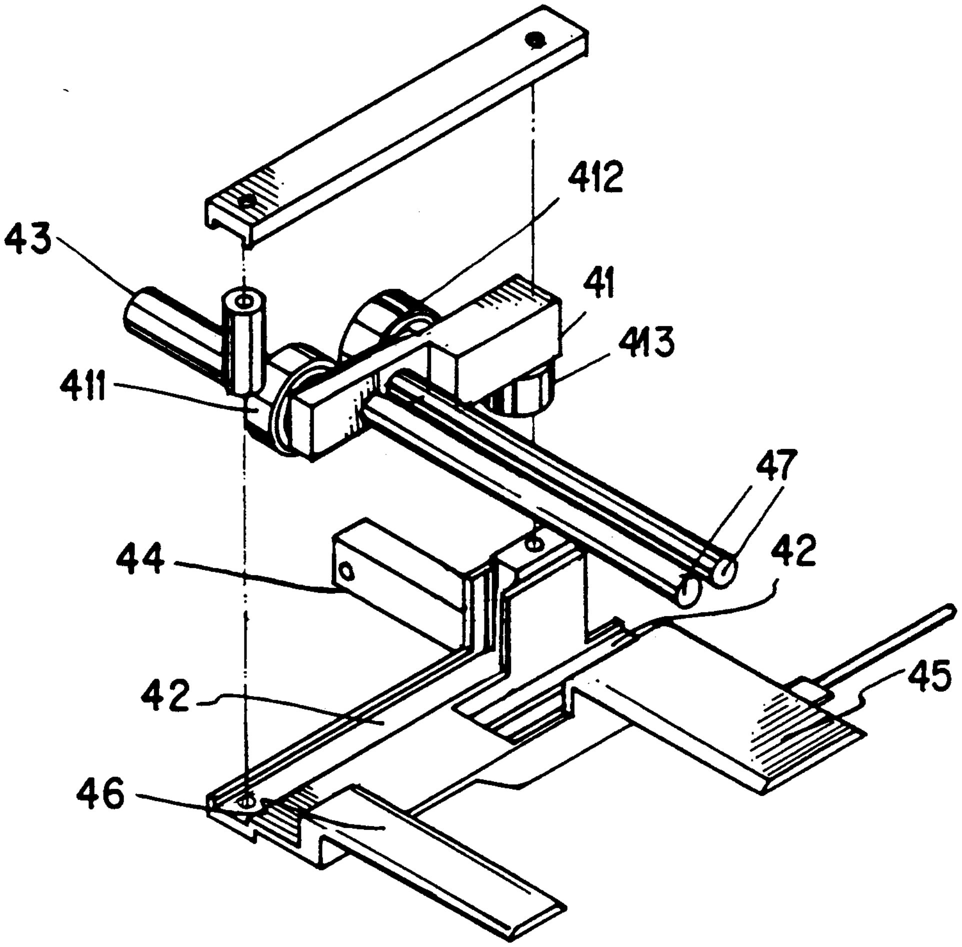
FIG. 6 is a fragmentary view of the sliding assembly according to the present invention.

With reference to FIGS. 5 and 6, the sliding assembly (4) is including a slide block (41), a sliding way (42), a sliding rod (43), a control rod (44), platforms (45) and (46), and two positioning rods (47). The slide block (41) is set in the sliding way (42) by means of pulleys (411), (412) and (413) and arranged to freely slide therealong. The sliding rod (43) and the control rod (44) respectively arranged at one side, while the platforms (45) and (46) and the positioning rods (47) are respectively arranged at the opposite side. Further, the sliding rod (43) and the positioning rods (47) are fixedly connected to the slide block (41) at both lateral sides to follow the slide block (41) to slide along the sliding way (42) rightward and leftward.

Referring to FIG. 2 again, the lifter (6) is including a cushion block (61), a linear motor (62), a lifting rod (63), and a guide block (64). The cushion block (61) is fixedly mounted on the inner top wall surface of the first chamber (11) of the housing (1). The linear motor (62) is set in the first chamber (11) below the cushion block (61). The lifting rod (63) is inserting through the linear motor (62) to freely move upward and downward and having its bottom end connected with the guide block (64), so as to carry the guide block (64) to move synchronously. The guide block (64) is comprising a notch (641) for setting therein of the control rod (44) of the sliding assembly (4).

Figure 7:
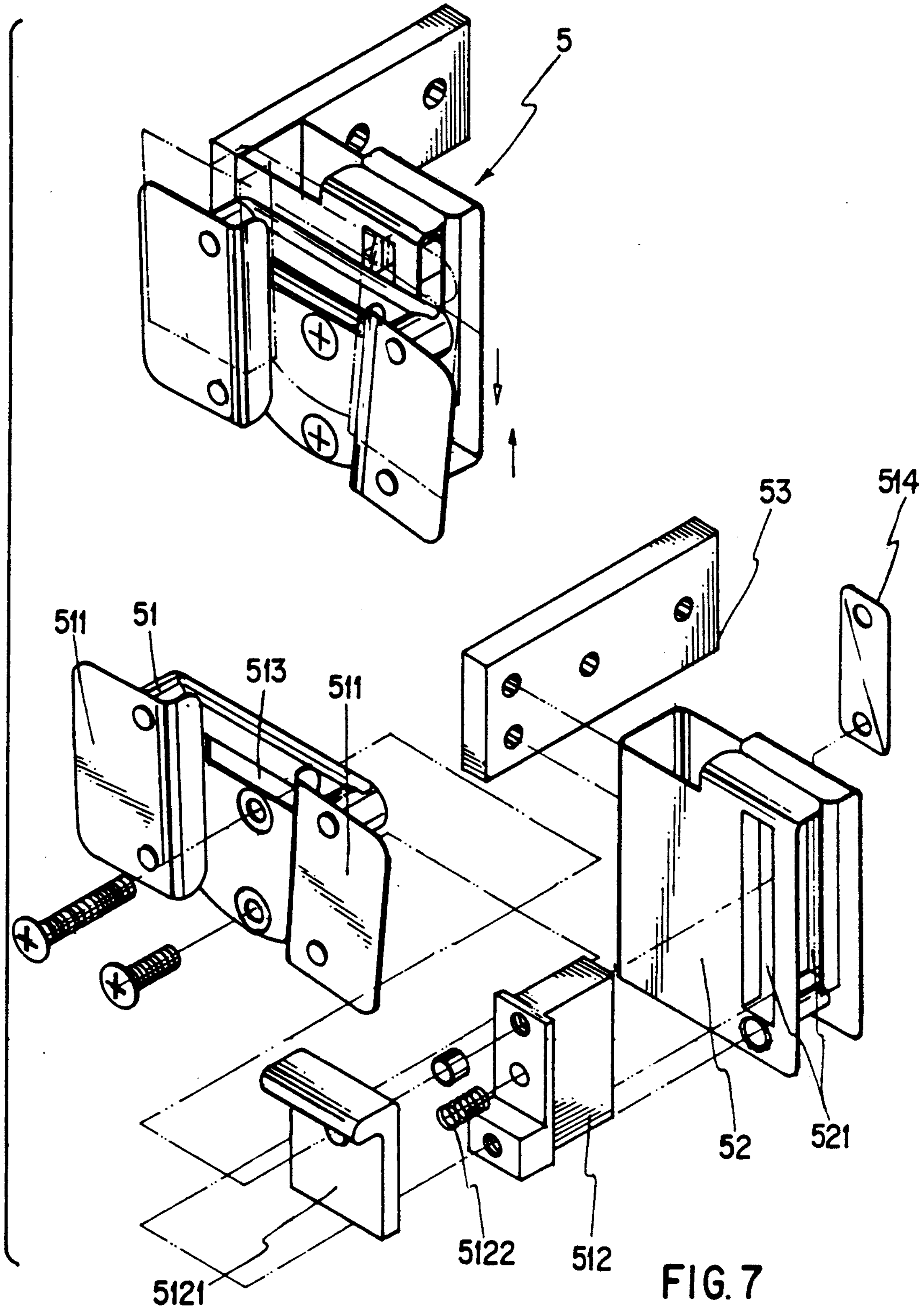
FIG. 7 is a perspective and a fragmentary view of the expander according to the present invention.

With reference to FIG. 7, the expander (5) is including a lifting assembly (51), a guiding assembly (52) and a positioning plate (53). The lifting assembly (51) is including two stop plates (511) having a wider upper end slightly reducing downward, a seat (512), a movable block (5121) connected to the seat (512) by means of a spring (5122). The seat (512) is having one side connected with the movable block (5121) by means of the spring (5122) and having the other side inserted into slot (521) of the guiding assembly (52) and fixedly connected thereto by means of a fixing plate (514), such that the seat (512) may be vertically sliding along the slot (521) and will not break away therefrom. The movable block (5121) is having an upper projecting portion inserted into the hole (513) of the lifting assembly (51). The guiding assembly (52) is having one sledded end connected to the positioning plate (53) at one side, and the positioning plate (53) is fixedly connected to machine frame and set right below the sliding assembly (4).

With reference to FIGS. 3A, the sliding rod (43) of the sliding assembly (4) is seated at a start position at the bottom of the "Y" shaped sliding way (35). Due to the effect of the spring (34), the selector block (31) is inclined leftward, while the support (32) is driven by the spring (37) to incline rightward. When the sliding rod (43) is lifted to the upper limit position (43)', the support (32) will be stopped by the side wall to make the sliding rod (43) sliding leftward along the "Y" shaped sliding way (35), to push the selector block (31) swing to the right side position (31)', and therefore, the support (32) will be simultaneously driven by the spring (37) to swing to the left side position (32)'. When the sliding rod (43) is dropping toward the start position, the support (32) is freely swinging to let the sliding rod (43) smoothly moving to the start position. During the secondary lifting motion, the selector block (31) is swinging rightward and the support (32) is swinging leftward, and therefore, the sliding rod (43) is sliding rightward along the "Y" shaped sliding way (35) to push the selector block (31) return to the left side position and to simultaneously carry the support (32) to the right side position. After secondary descending motion to the start position, it returns to the start position before the first lifting process. Through the said lifting and dropping motion, the sliding rod (43) is circularly positioning at the left and the right within the "Y" shaped sliding way (35).

Figure 8:
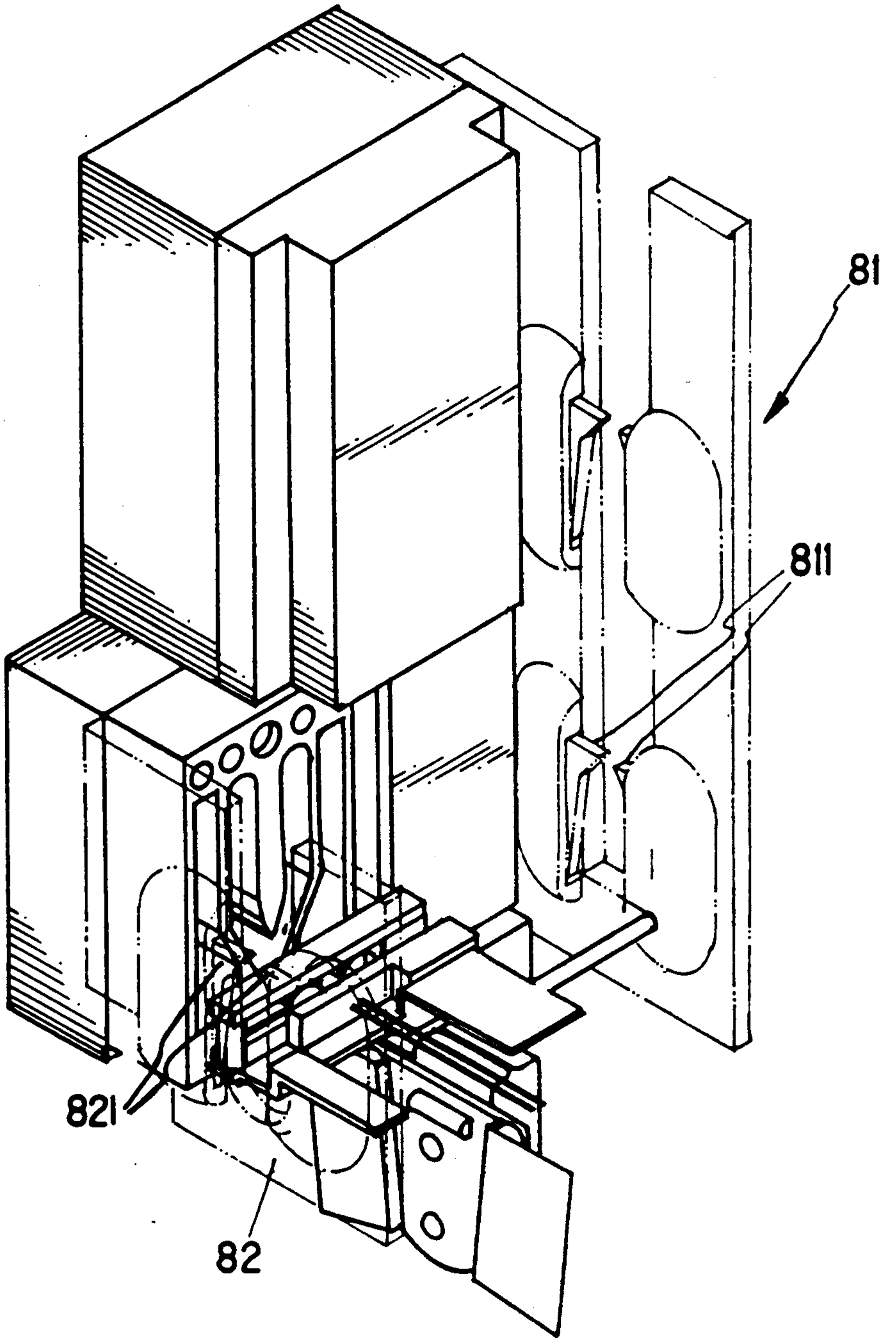
FIG. 8 is a perspective structural view of the present invention.
Figures 1, 8:
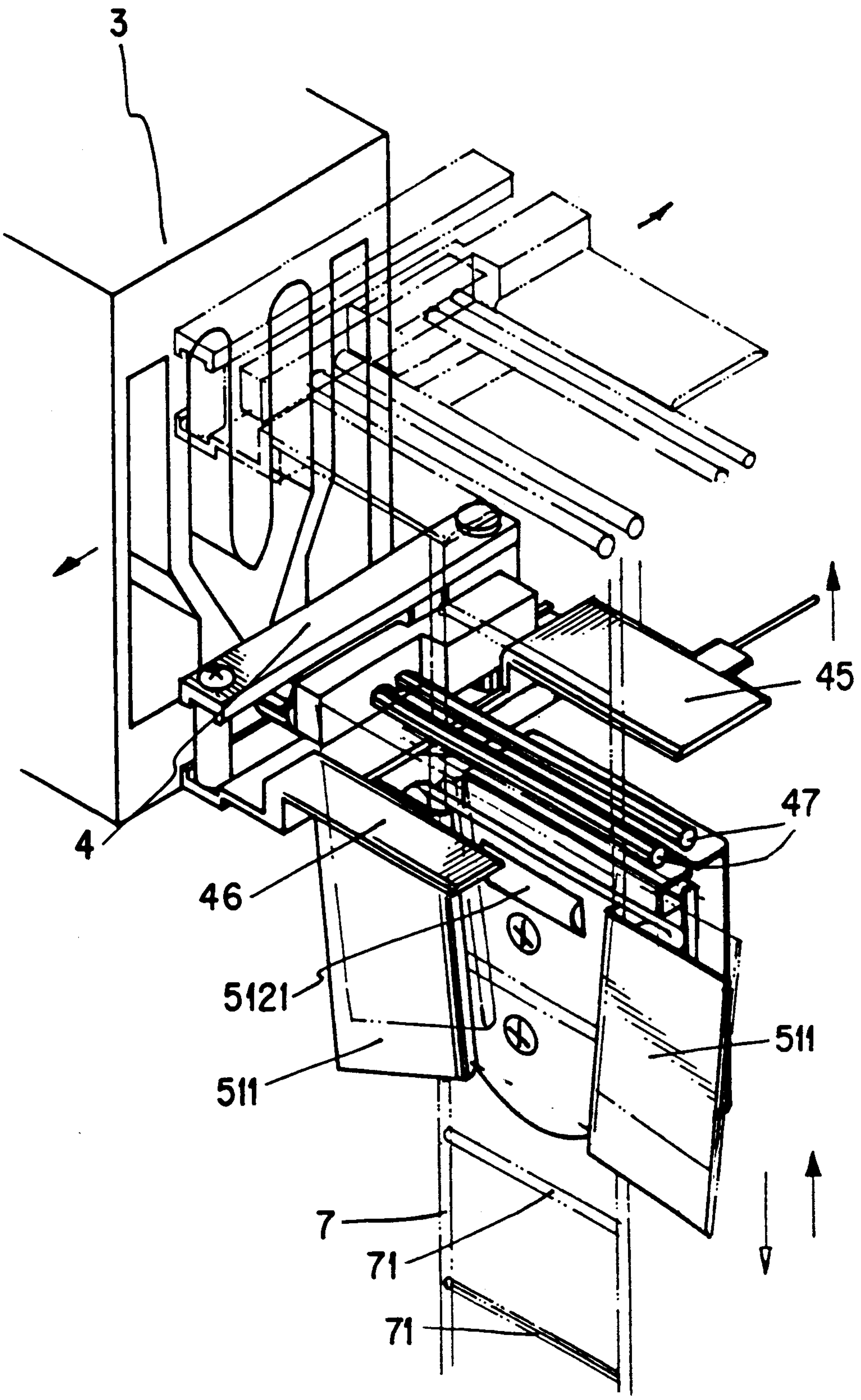

With reference to FIGS. 8 and 8-1, when in operation, the ladder-like binding cord (7) is having both two lateral lines respectively passing through the two stop plates (511) of the expander (5) and the gap between the two positioning rods (47) of the sliding assembly (4). Because the blades (not shown) are inserted through the gaps among the transverse lines (71) of the ladder-like binding cord (7) and transversely placed on the platforms (45) and (46) of the sliding assembly, when the present blade binding cord guiding arrangement is started, the sliding assembly (4) will carry the blades to move upward when it is lifting. Because the blades are retained with the transverse lines (71) of the binding cord (7), the binding cord (7) will be carried by the blades to move upward. Because of the special design of the stop plates (511) which are wider at the top and narrower at the bottom, when the binding cord (7) is carried to move upward, it will be prop open by the stop plates (511). At the same time, the transverse lines (71) will snap on the projecting portion of the movable block (5121) so as to carry the lifting assembly (51) to move upward concomitantly. When the sliding assembly (4) is lifted to the predetermined position, the blades will be bilaterally stopped by the hook means (811) and (821) of the fixed posts (81) and (82), and will not follow the sliding assembly (4) and the lifting assembly (51) to drop when the sliding assembly (4) and the lifting assembly (51) are descending to the reset position. At this moment, the ladder-like binding cord (7) is still bilaterally stretched to open and to wait for insertion of next blade. Through the circulation of the said motion, the transverse lines (71) of the binding cord (7) are intermittently set at both lateral sides of the venetian blind control rope in proper order to facilitate the insertion process of the blind blades and to eliminate bumping of blades against the cord.

What is claimed is:

1. A blade binding cord guiding arrangement for venetian blind making machine, comprising:

a housing having a larger chamber and a smaller chamber;

a cover covering the larger chamber of said housing;

a slotted selector assembly being set in the smaller chamber of said housing and including a selector block, a support, a supporting stand, springs, a "Y" shaped sliding way, and a "Y" shaped notch, said selector block having a bottom end connected with a top end of said support and movably disposed in the middle of the "Y" shaped notch, said selector block also comprising a screw bolt mounted on the selector block for connection with said supporting stand by means of a spring, and said support being connected to the middle part of said screw bolt by means of another spring;

a sliding assembly comprising a slide block, a sliding way a sliding rod, a control rod, two platforms and two positioning rods, said slide block comprising pulleys arranged to slide along said sliding way, said sliding rod being slidable in said "Y" shaped sliding way of said slotted selector assembly and to positioned be therein at the left or right position;

an expander mounted on the machine frame set below said sliding assembly; and a lifter comprising a cushion block, a linear motor, a lifting rod and a guide block, said cushion block being fixedly mounted on an inner top wall surface of the larger chamber of said housing, said linear motor being set in the bigger chamber of said housing below said cushion block, said lifting rod being insertable through said linear motor to freely move upward and downward and having a bottom end connected with said guide block, said guide block comprising a notch for receiving of said control rod of said sliding assembly;

characterized in that when the machine is started, said lifter carries said sliding assembly to lift and to let said slide block be alternatively positioned at the left or right position by means of the motion of said sliding rod in said "Y" shaped sliding way, and to concomitantly drive a ladder-like blade binding cord to move to the predetermined position and to be bilaterally expanded by said expander for smooth insertion of blind blades, and to further let the transverse lines of the ladder-like blade binding cord be intermittently arranged at both lateral sides of the venetian blind control rope, so as to let the blades and the blade binding cord of a finished venetian blind be smoothly piled up together when the venetian blind is collapsed.

* * * * *